United States Patent
Singh et al.

(10) Patent No.: US 10,762,406 B2
(45) Date of Patent: *Sep. 1, 2020

(54) SECURE QR CODE SERVICE

(71) Applicant: Mastercard International Incorporated, Purchase, NY (US)

(72) Inventors: Irina Singh, White Plains, NY (US); Suman Rausaria, Ballwin, MO (US); Shanthan Subramaniam, Baldwin Place, NY (US); Sandeep Malhotra, Greenwich, CT (US)

(73) Assignee: Mastercard International Incorporated, Purchase, NY (US)

( * ) Notice: Subject to any disclaimer, the term of this patent is extended or adjusted under 35 U.S.C. 154(b) by 46 days.

This patent is subject to a terminal disclaimer.

(21) Appl. No.: 16/567,439

(22) Filed: Sep. 11, 2019

(65) Prior Publication Data

US 2020/0005106 A1 Jan. 2, 2020

Related U.S. Application Data

(63) Continuation of application No. 15/817,530, filed on Nov. 20, 2017, now Pat. No. 10,445,629.

(51) Int. Cl.
*G06K 19/06* (2006.01)
*G06Q 20/32* (2012.01)
(Continued)

(52) U.S. Cl.
CPC ..... *G06K 19/06037* (2013.01); *G06Q 20/204* (2013.01); *G06Q 20/3276* (2013.01);
(Continued)

(58) Field of Classification Search
CPC ......... G06K 19/00; G06K 19/04; G06K 19/06
(Continued)

(56) References Cited

U.S. PATENT DOCUMENTS 6,990,471 B1 1/2006 Rajaram
2012/0089471 A1 4/2012 Comparelli
(Continued)

FOREIGN PATENT DOCUMENTS

WO 2015/042548 A1 3/2015

OTHER PUBLICATIONS

"PCT Notification of Transmittal of the International Search Report and the Written Opinion", International Searching Authority, dated Nov. 14, 2018, International Application No. PCT/US2018/048694, 13 pp.

*Primary Examiner* — Edwyn Labaze
(74) *Attorney, Agent, or Firm* — Buckley, Maschoff & Talwalkar LLC

(57) ABSTRACT

Methods and apparatus for generating a secure QR code for use in a purchase transaction. In an embodiment, a directory service computer verifies the identity of a merchant by matching an acquirer financial institution (FI)-signed certificate and a stored certificate, wherein the acquirer FI-signed certificate was received from a merchant device along with a secure QR code request. The directory service computer then establishes an encrypted and Pinned SSL tunnel with the merchant device, receives a transaction message including a transaction amount, a universal unique identifier (UUID), and a transaction identifier (ID), updates an application transaction count (ATC) associated with the merchant, and generates and stores a secure one-way Hash value, generated by using a merchant identifier (ID), the transaction amount, the ATC, the UUID, and the transaction ID. The directory service computer next generates a dynamic secure QR code by combining the Hash value, the transaction ID and the merchant ID, and transmits the dynamic secure QR code to the merchant device for use in conducting a purchase transaction.

22 Claims, 9 Drawing Sheets

(51) Int. Cl.
  *G06Q 20/38* (2012.01)
  *G06Q 20/36* (2012.01)
  *G06Q 20/20* (2012.01)

(52) U.S. Cl.
  CPC ....... *G06Q 20/367* (2013.01); *G06Q 20/3823* (2013.01); *G06Q 20/3827* (2013.01)

(58) Field of Classification Search
  USPC ........................................ 235/494, 375, 487
  See application file for complete search history.

(56) References Cited

U.S. PATENT DOCUMENTS

| | | |
|---|---|---|
| 2012/0209749 A1 | 8/2012 | Hammad et al. |
| 2013/0275306 A1 | 10/2013 | Ignatchenko |
| 2014/0379584 A1 | 12/2014 | Ward |
| 2015/0317632 A1 | 11/2015 | Park et al. |
| 2017/0293912 A1 | 10/2017 | Furche et al. |
| 2018/0332003 A1 | 11/2018 | Deriso |

SECURE QR CODE SERVICE

CROSS REFERENCE TO RELATED APPLICATION

This application is a continuation of U.S. patent application Ser. No. 15/817,530, filed on Nov. 20, 2017, the contents of which are incorporated herein by reference for all purposes.

FIELD OF THE DISCLOSURE

Embodiments described herein generally relate to processes and systems for providing secure QR code services to merchants and consumers. More particularly, disclosed is a secure QR code service that eliminates the dangers associated with prior art transactions utilizing QR codes, and that ensures data integrity and provides non-repudiation for transactions occurring between merchants and consumers.

BACKGROUND

Portable electronic devices, such as smartphones, tablet computers, digital music players and the like, have been developed that include desirable functionality and thus the number of mobile device users and/or owners keeps growing. Such mobile devices can store all types of information, and can perform many different types of functions for users. The overall popularity of such mobile devices, especially smartphones, has led to the development of processes for using them to conduct financial transactions, for example, transmission of a payment between a payer (a consumer or payment card account holder or cardholder) and a recipient (or payee, such as a merchant or another cardholder).

Electronic payment systems have been developed that provide financial transaction services to merchants and consumers. These payment systems typically provide financial transaction processing that protects the primary account numbers (PANs) (typically a sixteen-digit number) associated with financial accounts of consumers and of merchants from access by vandals by providing "tokenization" services. Tokenization prevents the unauthorized access to PANs by transforming a PAN into a token for use in the payment process, and thus, tokens have been defined as "surrogate/alternate values that replace PANs" in part of a payment system. Tokenized data typically includes, but is not limited to, a token PAN, and session keys or cryptographic keys that can be used a single time, or for a limited time, during a transaction. Once the tokenized card credentials are delivered into the consumer's device or wallet, the consumer can then use them to make a tokenized transaction at a merchant location and/or website. Typically, the consumer either taps a contactless terminal with the mobile device that has a mobile payment application containing tokenized credentials to make an in-store transaction, or uses a mobile payment application or web wallet to make an in app or online transaction using tokenized credentials. The token PAN, which typically has the same format as the PAN and is associated with the cardholder's sixteen-digit account number, is used to complete the purchase. The token is generated and managed by a token service provider (TSP), which de-tokenizes the token to obtain the PAN for use in processing the purchase transaction. Such processing improves the payment security of the transaction, since only the TSP, payment network and issuer/issuer processor see the actual PAN; the merchant and acquirer only see the token PAN.

Processes are also known wherein a payer utilizes a digital camera component of his or her mobile device (such as a smartphone or tablet computer) to scan a code, such as a barcode (a one-dimensional or 1D code), or a quick-response (QR) code (a two-dimensional or 2D barcode), for example, at a merchant store to initiate a purchase transaction. Barcodes and QR codes are machine-readable codes (either printed on paper or on another surface, or displayed on a display component). A barcode typically consists of lines of varying thickness to convey information, whereas a QR code is typically a square shape that consists of an array of black and white squares.

Conventionally, QR codes are used to store uniform resource locators (URLs) or other information that can be read by a camera component of a consumer's mobile device, which mobile device also includes a QR code application. For example, a retailer may have a sticker or label or sheet of paper having a merchant QR code printed thereon affixed to a countertop near a cash register (or on the cash register) at the merchant's retail store. In some embodiments, the label or sticker having the merchant QR code printed on it may be provided to the merchant by a payment processing company (or by some other trusted third party), and typically includes merchant identification data. In typical implementations, the merchant QR code includes a merchant payment account number (associated with a financial account of the merchant) for receiving payments in the clear. In an example purchase transaction involving use of a merchant QR code, the consumer uses a mobile payment application (which is configured for reading and interpreting QR code data) and the camera component of his or her mobile device to scan the merchant QR code, and then inputs a purchase transaction amount (the cost or price of the goods or services). The consumer's mobile device then transmits a payment request so that funds can be transferred from the consumer's payment card account to the merchant's payment account (which may be processed by a payments system such as the Mastercard MoneySend™ or Mastercard Send™ platforms). For such processing to be successful, both the merchant and the customer must be registered with a payments platform that accepts QR code transactions.

However, it is fairly simple for vandals to generate a malicious QR code by using, for example, an object-oriented computer programming language such as JavaScript, or by creating a link that tricks a user into utilizing a website that contains embedded malware. Thus, vandals have been able to use malicious QR codes to trick consumers into providing financial information and/or identity information, which a vandal can then use for fraudulent purposes such as, but not limited to, stealing money, opening fraudulent financial accounts, and/or stealing the user's identity to obtain fraudulent loans and the like. In addition, QR code systems are susceptible to "man in the middle" and/or "replay" attacks, wherein a hacker or other vandal intercepts and/or re-directs the consumer's payment before it reaches the merchant's payment account, or reuses the same credentials to make a duplicate payment. Most QR code hacks involve the hacker replacing the merchant's receiving account with the hacker's account without the knowledge of the merchant.

Accordingly, a need exists for a method and a system that provides a secure QR code for use in a purchase transaction that prevents phishing attacks and/or hacking of the QR code and/or other malicious use of such a QR code, and which method and system are easy and inexpensive to use and/or implement. In addition, a need exists for validating the secure QR code, thereby removing the risk of QR code replacement attacks.

BRIEF DESCRIPTION OF THE DRAWINGS

Features and advantages of some embodiments of the present disclosure, and the way such embodiments are accomplished, will become more readily apparent upon consideration of the following detailed description taken in conjunction with the accompanying drawings, which illustrate exemplary implementations and are not necessarily drawn to scale, wherein.

DETAILED DESCRIPTION

Figure 1:
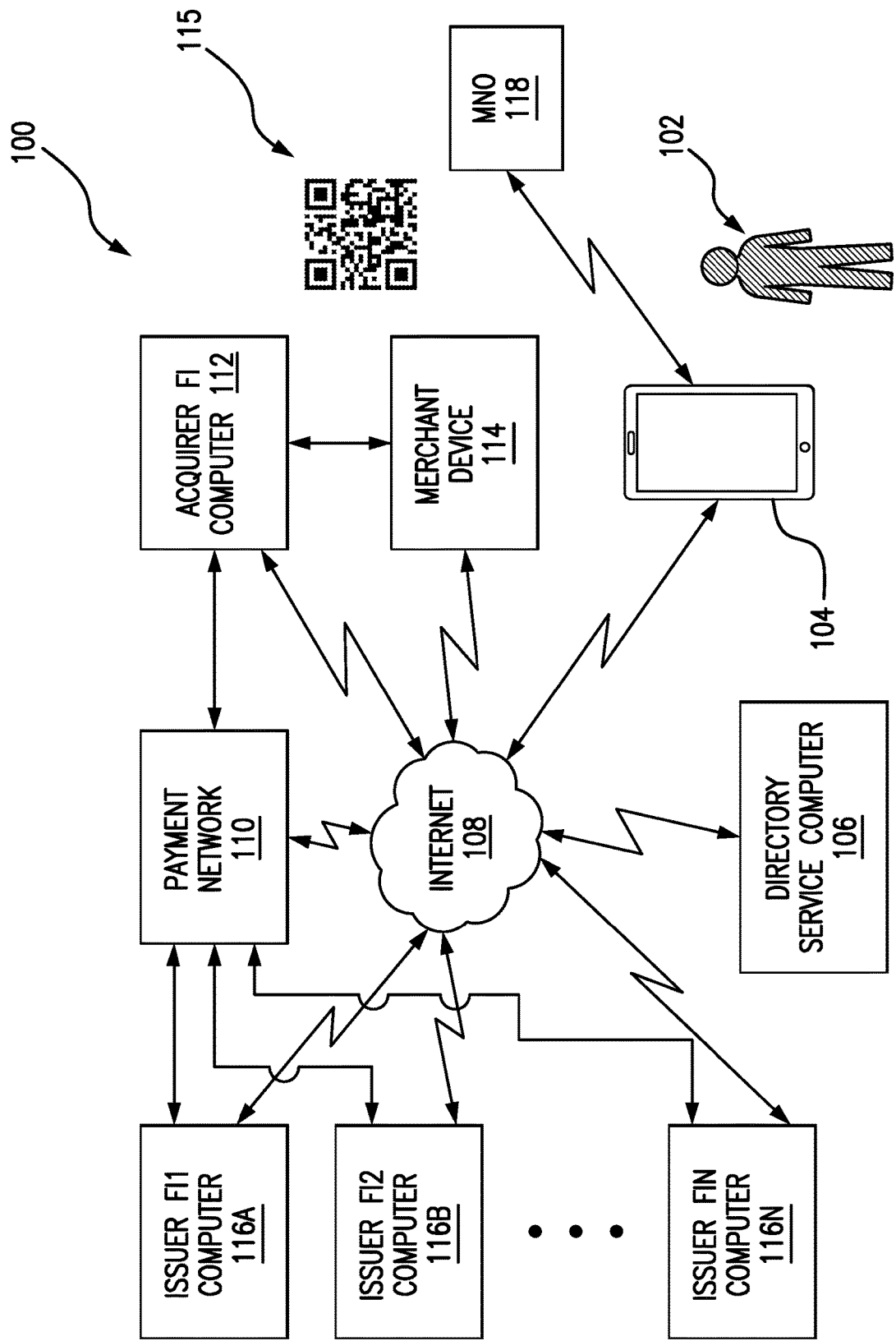
FIG. 1 is a block diagram of a secure QR code system in accordance with some embodiments of the disclosure.

Reference will now be made in detail to various novel embodiments, examples of which are illustrated in the accompanying drawings. It should be understood that the drawings and descriptions thereof are not intended to limit the invention to any particular embodiment(s). On the contrary, the descriptions provided herein are intended to cover alternatives, modifications, and equivalents thereof. In the following description, numerous specific details are set forth in order to provide a thorough understanding of the various embodiments, but some or all of these embodiments may be practiced without some or all of the specific details. In other instances, well-known process operations have not been described in detail in order not to unnecessarily obscure novel aspects.

A number of terms will be used herein. The use of such terms is not intended to be limiting, but rather are used for convenience and ease of exposition. For example, as used herein, the term "user" may be used interchangeably with the term "consumer" and/or "cardholder" and are used herein to refer to a consumer, person, individual, business or other entity that owns (or is authorized to use) a financial account, such as a payment card account (for example, a credit card account). In addition, the term "payment card account" may include a credit card account, a debit card account, and/or a deposit account or other type of financial account that an account holder may access. The term "payment card account number" includes a number that identifies a payment card system account or a number carried by a payment card, and/or a number that is used to route a transaction in a payment system that handles debit card and/or credit card transactions and the like. Moreover, as used herein the terms "payment card system" and/or "payment network" refer to a system and/or network for processing and/or handling purchase transactions and related transactions, which may be operated by a payment card system operator, such as Mastercard International Incorporated, or a similar system. In some embodiments, the term "payment card system" may be limited to systems in which member financial institutions (such as banks) issue payment card accounts to individuals, businesses and/or other entities or organizations. In addition, the term "mobile payment application" (MPA) is used interchangeably herein with the term "mobile wallet application." Additionally, the term "wallet" is used herein interchangeably with the term "digital wallet," wherein "wallet" may refer to the client (front-end) side or may refer to the entirety of the wallet solution, including the back-end system(s) utilized to initiate and complete financial transactions.

In general, and for the purposes of introducing concepts of novel embodiments described herein, described are systems and processes for generating a secure quick response (QR) code for use in purchase transactions at the time a consumer is ready to pay for a selected item or service. More particularly, described are systems and processes that facilitate generating a secure merchant QR code that is then used to initiate and to complete a purchase transaction with a consumer. For example, a directory service communicates with a merchant device to generate the secure QR code, and then communicates with an issuer financial institution (FI) associated with the consumer (who is involved in the transaction) so as to process purchase transaction data with the expectation of completing the purchase transaction (between the merchant and consumer).

In embodiments described herein, in order to use the directory service, customers of the directory service must first conduct an onboarding process (or registration process) that results in receiving a signed certificate from the directory service, which is then stored for future use. The term "customer" may refer to an issuer financial institution (FI), and/or an acquirer FI, and/or a merchant, and/or a payment processor. Thus, in some implementations, the acquirer FIs (which are associated with merchants), issuer FIs (such as banks, which issue payment card accounts to consumers), and payment processing entities (or payment gateway entities, which process purchase transaction data) each have an existing relationship (or active agreement) with a trusted third party which owns and/or operates the directory service. In an embodiment, the owner and/or operator of the directory service is a payments processing entity, such as Mastercard International Incorporated, the assignee of the present application. In addition, in some implementations the onboarding process is conducted in a secure, reliable and fast manner by utilizing X.509 certificates with SSL Pinning between the customer and the directory service.

In the field of cryptography, the X.509 standard defines the format of public key certificates. X.509 certificates are used in many Internet protocols, and are used in offline applications, like electronic signatures. An X.509 certificate contains a public key and an identity (such as a hostname, or an organization, or an individual), and is either signed by a certificate authority (CA) or is self-signed. When a certificate is signed by a CA (such as a directory service), or validated by another means, someone holding that certificate can rely on the public key it contains to establish secure communications with another party (or can validate documents that are digitally signed by the corresponding private key). The use of SSL Pinning ensures that the client computer checks the server's certificate against a known copy of that certificate before proceeding (for security purposes) with any data communications. This can be accomplished by bundling the server's SSL certificate inside the client application, and then ensuring that any SSL request first validates the server's certificate by ensuring that it exactly matches the bundle's certificate. Thus, SSL Pinning can be used for identity verification purposes to prevent so-called "Man in the Middle" attacks.

In some embodiments according to this disclosure, each acquirer FI must not only register themselves but also must register their associated merchants to the directory service as part of the onboarding process. In order to register their associated merchants to the directory service, each acquirer FI provides merchant information that may include, but is not limited to, merchant identification data (i.e., merchant name, email address, phone number and the like), merchant location data (e.g., the merchant's business address), bank credentials (e.g., bank routing number and financial account number for receiving funds, payment card credential data, and/or debit credentials, and the like), a merchant category code (MCC), and a terminal identifier (which may be used for payment card transactions) to the directory service. After the acquirer FI provides all required information, the directory service generates a unique identifier, such as a unique "Merchant Identifier," which facilitates the fast "look up" of merchant data during purchase transaction processing. In some implementations, the unique merchant identifier is generated using the UUID or "universally unique identifier."

In order to obtain a signed certificate from the directory service, the acquirer FI, the issuer FI, or the payment processor first creates a key pair (a public key and a private key), and then sends a certificate signing request containing the public key of the key pair to the directory service (which is the root authority). The directory service then signs the public key and sends it back to the requesting party (either the acquirer FI, issuer FI, or payment processor) which stores the certificate with its private key (of the key pair) for future use when accessing the directory service. In some embodiments, the merchant creates the key pair and transmits a certificate signing request to its' associated acquirer FI. The acquirer FI then signs the key with the "acquirer signed certificate" and transmits that data to the merchant as a Merchant's certificate. The merchant stores the Merchant's certificate, which can then be used in the future to enable identity verification of the merchant during transaction processing. The Merchant's certificate also provides data non-repudiation, as will be explained below.

In embodiments where a particular merchant does not use an electronic point-of-sale (POS) terminal, a smartphone, a tablet computer, or other type of electronic device configured for electronic payments, the directory service may generate a secure static QR code for use by the merchant to conduct purchase transactions with consumers. For example, in some implementations the directory service generates a secure static QR code that includes the merchant identifier (Merchant ID) and a hash of merchant data. The hash of merchant data may, for example, be composed of a hash of the Merchant ID, the merchant name, merchant store location, and a unique number (i.e., the UUID). Accordingly, in this implementation, the transaction amount of the purchase transaction is not utilized to generate the secure static QR code. Instead, the merchant displays the static QR code (for example, on a printed label) for use in conducting secure QR code purchase transactions, and the directory service stores the hash for QR code validation purposes when contacted to complete a purchase transaction.

Thus, in some embodiments, the directory service performs identity verification of registered participants using X.509 certificates, generates a secure one-way hash (for providing data integrity), generates the secure QR code, and transmits the secure QR code to the merchant for display so that it can be read by a consumer mobile device (such as a smartphone, tablet computer, personal digital assistant and the like) having an appropriate mobile payment application to conduct a purchase transaction. As mentioned above, the directory service may generate the secure QR code in either of two ways. A registered merchant can enable generation of a secure dynamic QR code, or can enable generation of a secure static QR code for use in purchase transactions. Accordingly, the directory service utilizes industry standard processes to generate secure QR codes and communicates using standard protocols (for example, via an application program interface (API), standard messaging and the like). Thus, the processes and systems described herein can be utilized to conduct secure QR code transactions to electronically transfer funds (money) from consumers to merchants that may be initiated, for example, through an electronic terminal or other merchant device, including credit card, debit card, and pre-paid card transactions which may be processed by the Automated Clearing House (ACH) network, or any new schemes where a secure QR code is needed.

FIG. 1 is a block diagram of a secure QR code system 100 in which teachings of the present disclosure may be applied. An individual user, cardholder or consumer is indicated by reference numeral 102 in FIG. 1. Many of the users 102 habitually carry with them mobile devices 104, such as smartphones, tablet computers, or the like, which can perform mobile device payment transactions. Thus, the mobile device 104 may be configured to communicate with one or more of the components of the secure QR code system 100 via the Internet 108 and/or wirelessly via a mobile network operator ("MNO") system 118. For example, the mobile device 104 can communicate with other user mobile devices (not shown) via the MNO 118, for example, to exchange audio and/or text messages and the like.

In some embodiments, a directory service computer 106 is connected via the Internet 108 to the payment network 110, acquirer FI computer 112, merchant device 114, and to a plurality of issuer FI computers 116A, 116B to 116N. However, in some implementations, communications between the directory service computer 106 and one or more of the other system components may occur through use of a private network or a public network and/or combinations thereof (not shown in FIG. 1). Also, in practical systems in accordance with embodiments described herein, multiple merchant acquirer FIs 116, a plurality of merchant devices 114, a plurality of consumer mobile devices 104, and multiple payment networks 110 may be operably connected to the directory service computer 106. In addition, the merchant device 114 may include additional components, for example, computer servers and/or networks (not shown) for providing a merchant website, and/or one or more merchant terminals (such as a point-of-sale (POS) terminal) that may include a QR code reader or QR code scanner (not shown).

Figure 3:
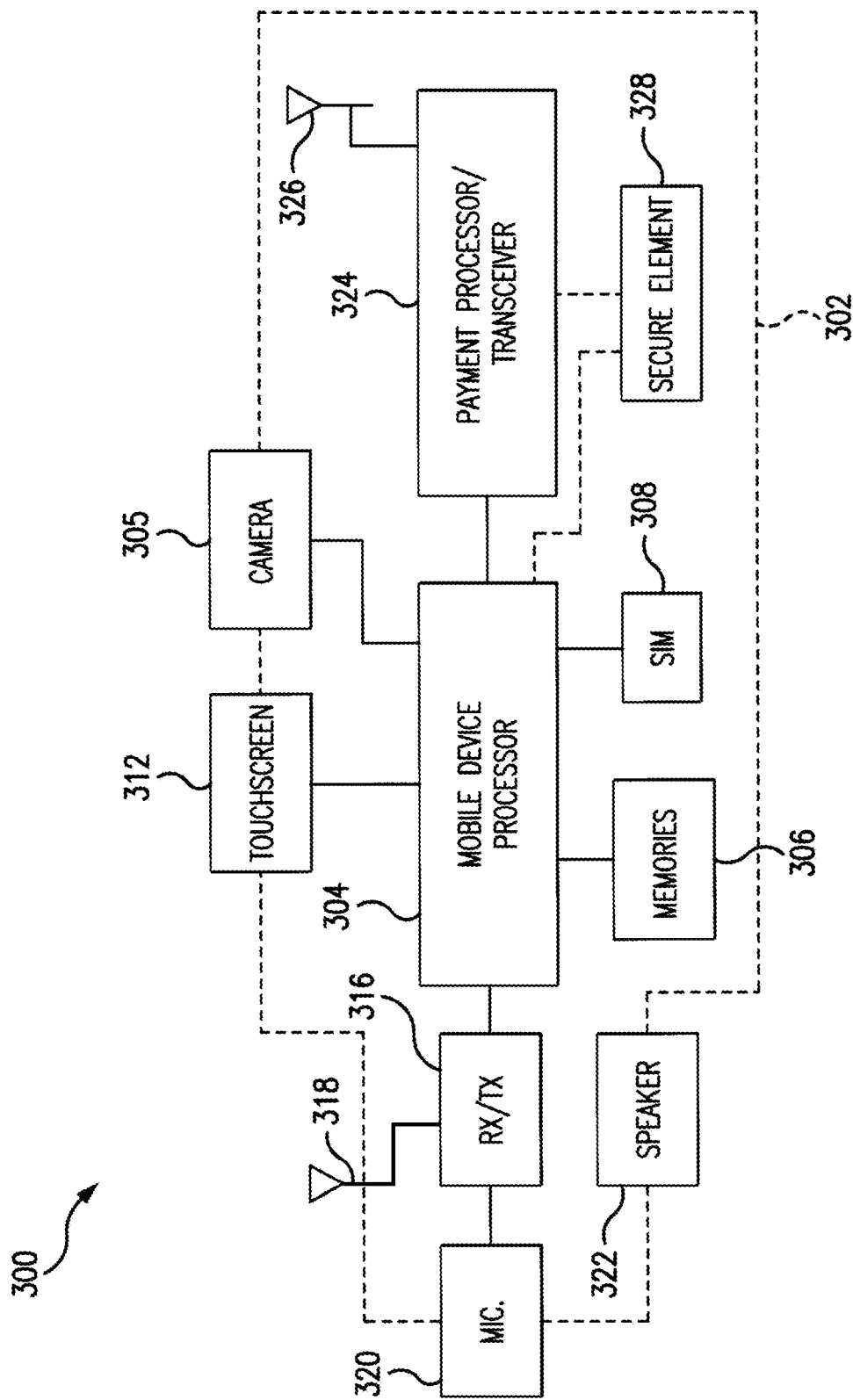
FIG. 3 is a block diagram of an embodiment of a mobile device to illustrate hardware aspects in accordance with some embodiments of the disclosure.

Referring again to FIG. 1, the consumer's mobile device 104 (for example, an iPhone™ or Android™ device) typically includes components such as a microphone, speaker, touchscreen, and a digital camera (See FIG. 3). In some embodiments, the mobile device 104 also includes a mobile wallet application and/or a web wallet application that may include a software development kit (SDK) or the like (not shown). An SDK may facilitate communications between the consumer's digital wallet and the consumer's issuer FI, as well as perform additional operations, such as payment card account management, transaction management, fraud operations, and/or digital wallet management functions, and the like. Thus, in accordance with embodiments described herein, the consumer's mobile device 104 includes software instructions (such as a mobile wallet application or mobile wallet app) configured to read a secure QR code 115 (which may be displayed on a display screen (not shown) of the merchant device 114, or in some implementations, printed on a substrate), and then communicates with, for example, issuer financial institution (FI) 116A and/or with other devices and/or entities via the Internet 108 (or via other systems or networks) when conducting a purchase transaction. It should also be understood that, in accordance with some embodiments, the merchant device 114 may be a smartphone or other type of mobile device.

In some embodiments, after the consumer 102 is finished shopping at the merchant's store location, a cashier or other customer service representative operates the merchant device 114 and opens a QR code application (which QR code application may have been provided to the merchant by, for example, the acquirer FI computer 112 or the directory service computer 106). In some embodiments, a QR code application user interface (API) is then displayed on a display screen (not shown) of the merchant device 114 (which may be a point-of-sale (POS) terminal having a display screen, or may be a smartphone, tablet computer, or other electronic device having a display screen). Next, in some implementations, a cashier or other merchant representative or employee enters the total transaction amount (for the consumer to pay) by using an input component (not shown) such as a keypad, touch screen or keyboard associated with the merchant device 114. After entry of the total transaction amount, the cashier requests a dynamic QR code by, for example, pressing a "Request QR" button displayed on a touch screen. The secure QR code app (or SDK) then causes the merchant device 114 to generate a unique number using a Universal Unique Identifier (UUID), which is a 128-bit number that is used to uniquely identify an object or entity on the Internet. (Depending on the specific mechanisms used to generate it, a UUID is either guaranteed to be different or is, at least, extremely likely to be different from any other UUID generated until 3400 A.D.)

Referring again to FIG. 1, the merchant device 114 via the secure QR code app then establishes a connection to the directory service computer 106, and transmits the certificate (i.e., the acquirer-signed merchant certificate received during the onboarding process) to the directory service computer 106. Next, the directory service computer 106 verifies the identity of the merchant by matching the merchant certificate to one stored in a memory (generated during the onboarding process), and establishes an encrypted and Pinned SSL tunnel between the secure QR code app of the merchant device 114 and the directory service computer 106 by using the certificate (which includes the acquirer FI-signed merchant certificate and the trusted third party signed acquirer certificate). The merchant device 114 then transmits a message via the Pinned SSL tunnel to the directory service computer 106, which message is dynamically created by using the transaction amount, the UUID, and a transaction identifier. The transaction identifier (transaction ID) is a unique identifier assigned by the merchant (or the business) to each transaction that has been made with a payment card account. The transaction identifier uniquely identifies the transaction for the merchant, and use of the trusted and Pinned SSL tunnel provides non-repudiation of the transaction (also due to the use of the digital signature, which was provided by the directory service during onboarding).

Referring again to FIG. 1, upon receipt of the message from the merchant device 114, the directory service computer 106 updates an Application Transaction Count (ATC) for the merchant, and generates a Hash value utilizing the merchant ID, merchant name, merchant location data, the transaction amount, the ATC, the UUID, and the transaction ID. The Hash value is a secure one-way Hash and guarantees data integrity (i.e., ensures that the data has not been tampered with). The directory service computer 106 then stores this Hash value and generates dynamic secure QR code data by combining the Hash, the transaction ID and the merchant ID. The dynamic secure QR code data is then transmitted to the merchant device 114, which displays the dynamic secure QR code 115 on a display screen (not shown) associated with the merchant device 114 for reading by a camera component (not shown) of the consumer's mobile device 104.

Once the merchant device 114 displays the dynamic secure QR code 115, the consumer 102 utilizes the issuer FI wallet app or mobile banking app, which is running on his or her mobile device 104, and a digital camera (not shown) to scan the dynamic secure QR code. The mobile device 104 then transmits the scanned dynamic QR code data to the consumer's issuer FI bank (for example, to the issuer FI2 computer 116B via the Internet of via the MNO 118). Upon receipt of the dynamic QR code data, the issuer FI computer 116B establishes communications with the directory service computer 106 and then authenticates to the directory Service computer 106 by using its own certificate (i.e., the trusted third party issuer FI certificate generated during the registration and/or onboarding process). The directory service computer 106 then performs Identity Verification of the issuer FI computer 116B by using the certificate, and when the issuer FI computer 116B is verified, then establishes a trusted and Pinned SSL tunnel. Establishment of the trusted and Pinned SSL tunnel provides non-repudiation for the Issuer FI.

Next, the issuer FI computers 116B transmits a message containing the Hash, the transaction ID, and the merchant ID to the directory service computer 106 on the encrypted and Pinned SSL tunnel. The directory service computer 106 looks up the merchant using the merchant ID, validates the Hash (for security and data integrity purposes, to ensure that the data has not been tampered with), and identifies or verifies the transaction amount using the transaction ID. Once all is in order, the directory service computer 106 transmits the payment credentials and the transaction amount to the issuer FI computer associated with the consumer's payment card account (in this example, issuer FI computer 116B) via the encrypted tunnel. The consumer's issuer FI computer 116B receives the payment credentials, and transmits a confirmation message back to directory service computer 106, and transmits the confirmation message to the consumer's mobile device 104. The directory service computer 106 then sends a confirmation message back to merchant device 114 via the QR code app. Payment processing then continues in a "business as usual" (BAU) manner to complete the purchase transaction processing (meaning, for example, in the case of a credit card, that the issuer FI checks that the consumer has adequate credit to cover the total cost of the purchase transaction, and the like). The disclosed solution is valid for many kinds of digital wallets that would support Masterpass™, including an issuer FI, digital activity customers (such as Apple Pay, and the like), and Masterpass™ direct offered by Mastercard, as well as for other types of digital wallets where secure QR codes are required.

Figure 2A:
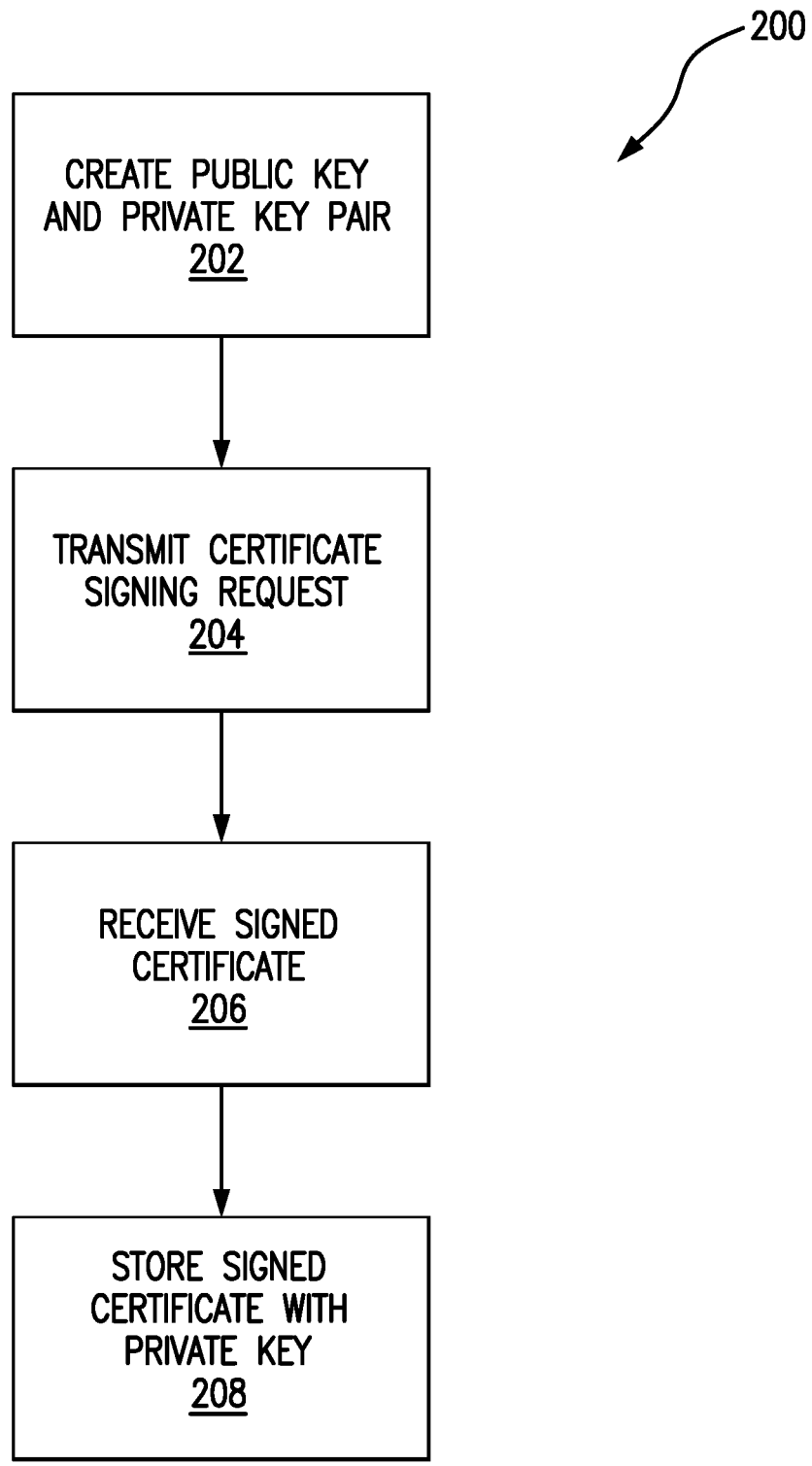
FIG. 2A is a flowchart illustrating an onboarding or registration and certificate issuing process in accordance with some embodiments of the disclosure.

FIG. 2A is a flowchart illustrating an onboarding and certificate issuing process 200 for issuer financial institutions (FIs) and/or acquirer FIs and/or payment processor entities in accordance with some embodiments. An acquirer FI or issuer FI or payment processor company (a customer) creates 202 a public key and a private key pair with identity information. Digital signature solution providers follow a specific protocol, called Public Key Infrastructure (PKI) that requires the provider to use a mathematical algorithm to generate two long numbers, one of which is the public key, and the other is the private key. The private key is not shared and is used only by the signer to electronically sign documents, whereas the public key is openly available and can be used by those who need to validate the signer's electronic signature. The PKI enforces additional requirements, for example, use of a Certificate Authority (CA), a digital certificate, end-user enrollment processes, and tools for managing, renewing, and revoking keys and certificates.

Referring again to FIG. 2A, after generating the public and private keys with the identity information, the customer (one of the acquirer FI or issuer FI or payment processor company) transmits 204 a certificate signing request to the certificate authority (CA). The CA is a trusted service provider, which consists of one or more third party organizations that are widely accepted as reliable for ensuring key security, and that can provide the necessary digital certificates. For example, a payments processing company (such as Mastercard International Incorporated, the assignee of the present application) may assume the role of a CA in some embodiments. The acquirer FI or issuer FI or payment processor company then receives 206 the signed certificate and stores 208 the signed certificate with its' private key. The signed certificate will be used whenever the client needs to access the directory service computer.

Figure 2B:
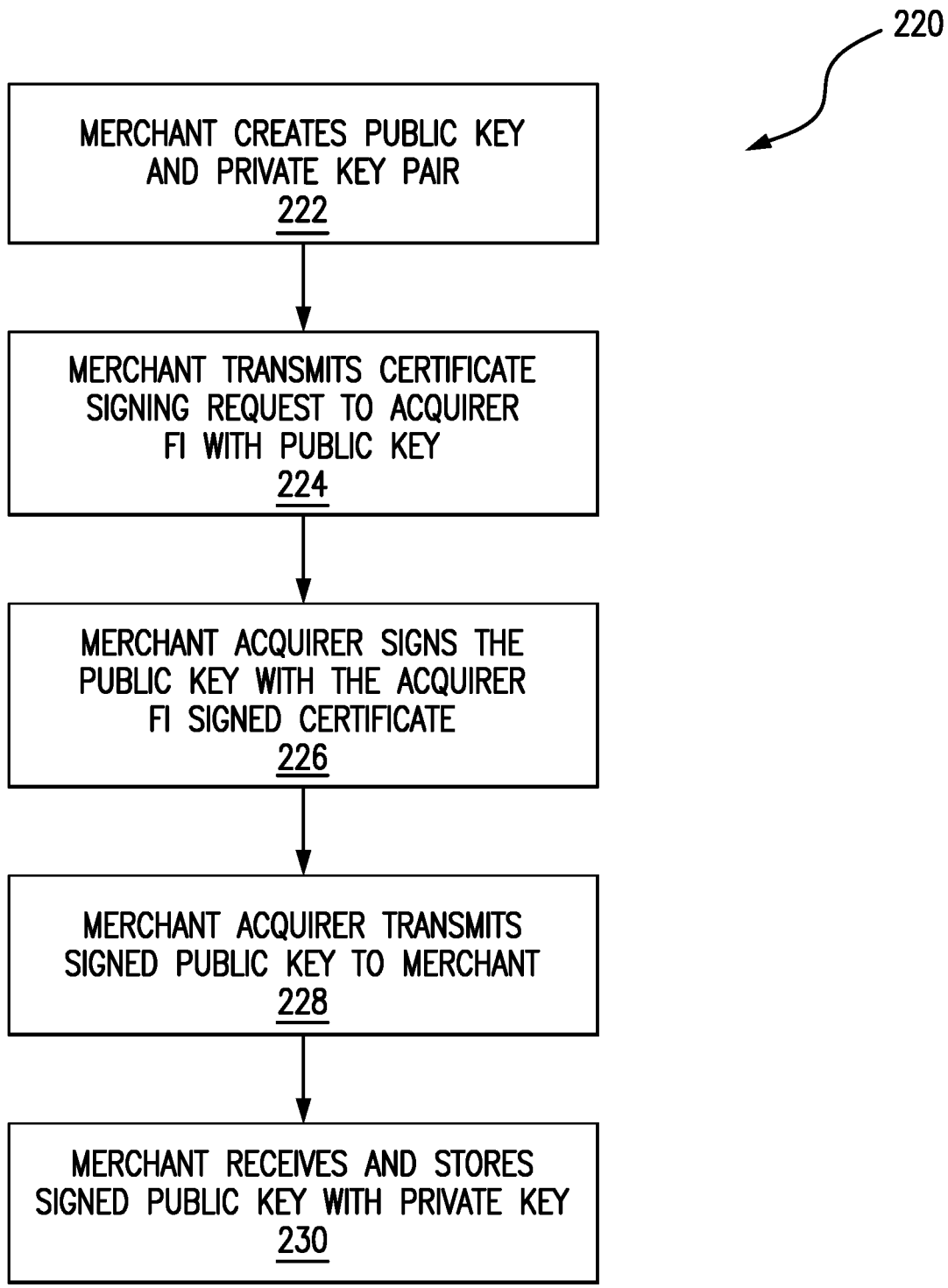
FIG. 2B is a flowchart illustrating another onboarding or registration and certificate issuing process for merchants in accordance with some embodiments of the disclosure.

FIG. 2B is a flowchart illustrating an onboarding or registration and certificate issuing process 220 for merchants in accordance with some embodiments. In some implementations, the merchant's acquirer FI is responsible for providing a certificate to the merchant. Thus the merchant acquirer creates 222 a public key and a private key pair, and then transmits 224 a certificate signing request with the public key to its acquirer FI. The acquirer FI then signs 226 the public key with the acquirer FI's signed certificate, and transmits 228 the signed public key to the merchant. The merchant receives 230 the signed public key from the acquirer FI (which obtained the signed certificate from the CA), and stores the signed public key with the private key. The signed certificate will be used by the merchant app when the merchant requests a QR code from the directory service.

FIG. 3 is a block diagram of an embodiment of a mobile device 300 to illustrate some hardware aspects. In this example, the mobile device 300 is a smartphone that can be used by a merchant as a point-of-interaction (POI) device for conducting purchase transactions. Thus, the smartphone 300 may be configured to obtain and display a secure merchant QR code in accordance with aspects of a secure QR code purchase transaction as described herein. A smartphone 300 could also be utilized by a consumer, and therefore may be configured for reading secure merchant QR codes when conducting purchase transactions in accordance with methods described herein. It should be understood that although a smartphone 300 is shown, other types of electronic devices, such as a tablet computer or laptop computer having wireless communications capability, may be utilized by merchants and/or consumers in accordance with the secure QR code processes described herein. In addition, in some embodiments the novel functionality described herein may result at least partially from software and/or firmware that improves and/or transforms one or more hardware components such as one or more controllers and/or processors of the smartphone 300.

The smartphone 300 may include a conventional housing (indicated by dashed line 302 in FIG. 3) that contains and/or supports the other components of the smartphone. The housing 302 may be shaped and sized to be held in a user's hand, and may for example exhibit the type of form factor that is common with the current generation of smartphones. The smartphone 300 further includes a mobile device processor 304 for controlling over-all operations.

Other components of the smartphone 300, which are in communication with and/or controlled by the mobile device processor 304, include one or more memory devices 306 (such as program and working memory, etc.), a SIM (subscriber identification module) card 308, a camera 305, and a touchscreen 312 (which may serve as the primary input/output device) for receiving input information from the user and for displaying output information to the user. The smartphone 300 may also include physically-actuatable switches and/or controls (not shown), such as an on/off/reset switch, a menu button, a "back" button, a volume control dial or switch, and the like.

The smartphone 300 also includes receive/transmit circuitry 316 that is also in communication with and/or controlled by the mobile device processor 304. The receive/transmit circuitry 316 is coupled to an antenna 318 and provides the communication channel(s) by which the smartphone 300 communicates via a mobile telephone communication network (not shown). Thus, the receive/transmit circuitry 316 may operate both to receive and transmit voice signals, in addition to performing data communication functions. As is known to those who are skilled in the art, such data communication may be via HTTP (HyperText Transfer Protocol) or other communication protocol suitable for carrying out data communication over the Internet and/or other types of computer networks.

The smartphone 300 further includes a microphone 320 coupled to the receive/transmit circuitry 316. Of course, the microphone 320 is for receiving voice input from the user. In addition, a speaker 322 is included to provide sound output to the user, and is coupled to the receive/transmit circuitry 316.

The receive/transmit circuitry 316 may operate in a conventional fashion to transmit, via the antenna 318, voice signals generated by the microphone 320, and to reproduce, via the speaker 322, voice signals received via the antenna 318. The receive/transmit circuitry 316 may also handle transmission and reception of text messages and other data communications via the antenna 318.

The smartphone 300 may also include a payment processor/transceiver 324 that is partly or wholly dedicated to implementing NFC communications functionality of the smartphone 300. Thus, the smartphone 300 may also include a loop antenna 326 coupled to the payment processor/transceiver 324. In some embodiments, functionality of the payment processor/transceiver 324 may partially overlap with the mobile device processor 304 of the smartphone 300. Moreover, the payment processor/transceiver 324 and the mobile device processor may be operably connected to a secure element 328. The term "secure element" is known to those who are skilled in the art, and typically refers to a device that may include a small processor and volatile and/or nonvolatile memory (not separately shown) that is secured from tampering and/or reprogramming by suitable measures. In some embodiments, the secure element 328 may be provided as part of the SIM card 308. In other embodiments, the secure element 328 may be constituted by an integrated circuit card separate from the SIM card 308, but which may have the same or similar form factor as the SIM card 308. In some embodiments of the smartphone 300, the secure element 328 may be programmed in accordance with one or more aspects of the present disclosure. (It should be noted that the term "secure element" is not intended to be limited to devices that are IC-based, but rather, may also include any secure execution environment (SEE) in a mobile device, and may include software-based secure execution environments running, for example, on the mobile device processor 304.) According to aspects of the present disclosure, a mobile device payment application may be stored in the secure element 328 and can be used to read a secure QR code displayed by a merchant to initiate a purchase transaction. Alternately, in some embodiments the mobile device payment application may be stored in memory 306 (such as a hard drive or solid-state drive (SSD)).

It should also be understood that the smartphone 300 may be operable as a conventional mobile telephone for communication—both voice and data—over a conventional mobile telecommunications network owned and/or operated by a mobile network operator (MNO) 118 as shown in FIG. 1. Thus, the smartphone 300 may be in communication from time to time in a conventional manner with such a mobile network operator.

As is familiar to those who are skilled in the art, the smartphone 300 may be viewed as a small computing device. Thus, the smartphone 300 may include one or more processors that are programmed by software, apps and/or other processor-executable steps to provide secure QR code functionality as described herein. The software, apps and/or other processor-executable steps may be stored in one or more computer-readable storage media (such as the storage devices 306 and/or the secure element 328) and may comprise program instructions, which may be referred to as computer readable program code means and the like.

Figure 4:
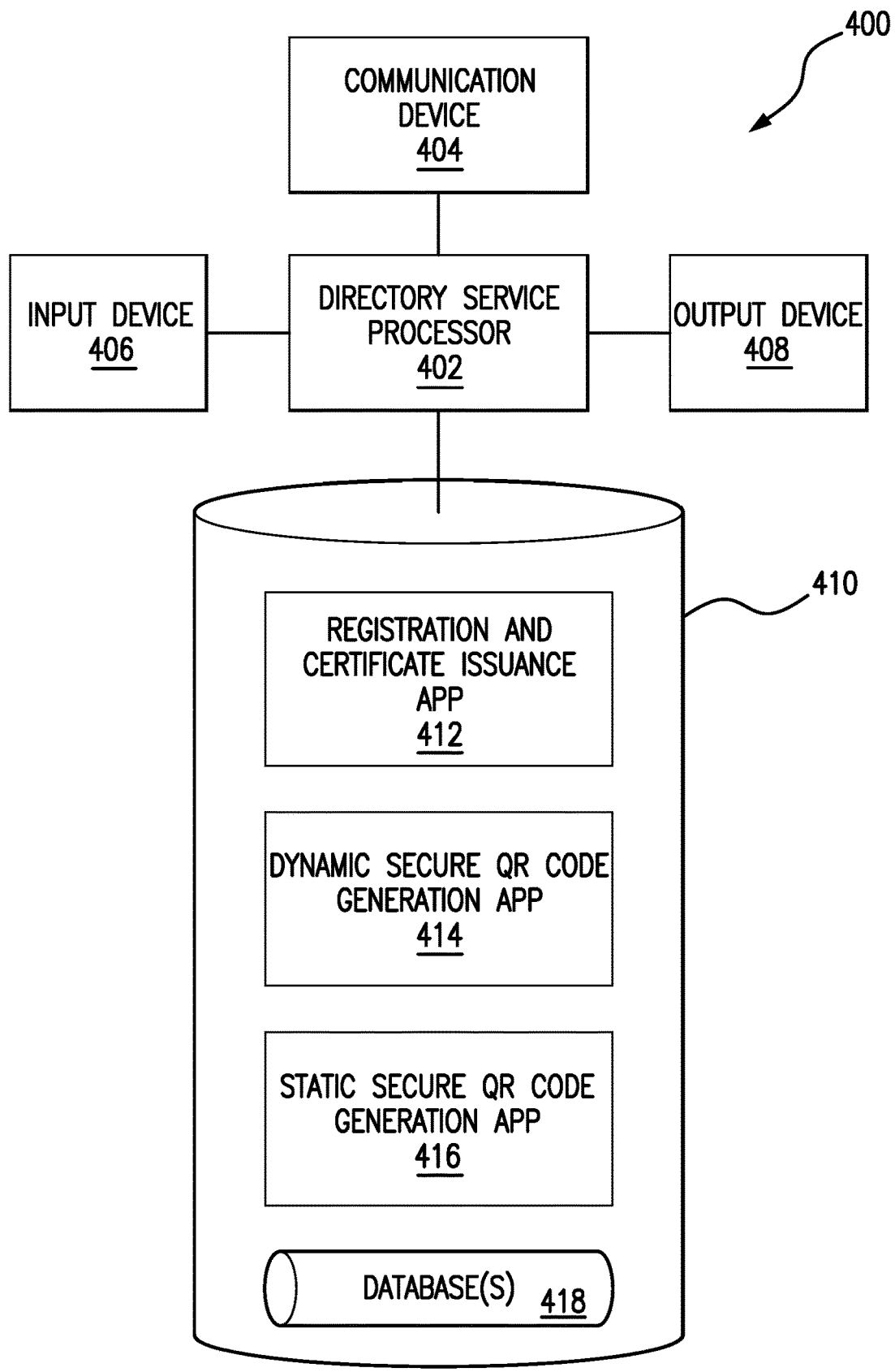
FIG. 4 is a block diagram of a directory service computer in accordance with some embodiments of the disclosure.

FIG. 4 is a block diagram of a directory service computer 400 that may be utilized in accordance with aspects of the present disclosure. The directory service computer 400 may include standard components and/or custom-designed and/or proprietary components in terms of its hardware and/or architecture, and may be controlled by software to cause it to function as described herein. For example, the directory service computer 400 may include server computer hardware.

Referring to FIG. 4, the directory service computer system 400 may include a directory service processor 402 operatively coupled to a communication device 404, an input device 406, an output device 408, and a storage device 410. The directory service processor 402 may be constituted by one or more processors (one or more of which may be custom designed), and operates to execute processor-executable steps, contained in program instructions described below, so as to control the directory service computer 400 to provide desired functionality.

Communication device 404 may be used to facilitate communication with, for example, other devices (such as computers operated by acquirers and/or issuers, one or more consumer mobile devices, and/or one or more computers operated by a payment processing network, as shown in FIG. 1). For example, communication device 404 may comprise numerous communication ports (not separately shown), to allow the directory service computer 400 to communicate simultaneously with a number of other computers and other devices, including communications as required to simultaneously handle numerous requests for secure QR codes. Thus, the communication device 404 may be configured for wireless communications and/or wired communications via various different types of networks, such as the Internet.

Input device 406 may comprise one or more of any type of peripheral device typically used to input data into a computer. For example, the input device 406 may include a keyboard and a mouse. Output device 408 may comprise, for example, a display and/or a printer. In some embodiments, the input device 406 and the output device 408 comprise a touch screen.

Storage device 410 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and the like. Any one or more of such information storage devices may be considered to be a non-transitory computer-readable storage medium or computer usable medium or memory.

Storage device 410 stores one or more computer programs for controlling the directory service processor 402. The programs comprise program instructions (which may be referred to as computer readable program code means) that contain processor-executable process steps of the directory service computer 400, executed by the directory service processor 402 to cause the directory service computer 400 to function as described herein.

The programs may include one or more conventional operating systems (not shown) that control the directory service processor 402 to manage and coordinate activities and sharing of resources in the directory service computer 400, and to serve as a host for application programs that run on the directory service computer 400.

The storage device 410 may store a customer registration and certificate issuance application 412 that controls the directory service processor 402 to enable the directory service computer 400 to provide onboarding and/or registration and certificate issuance services. In addition, the storage device 410 may store a dynamic secure code generation application 414 and a static secure code generation application 416, which enable the directory service computer 400 to generate and provide a secure dynamic QR code or a secure static QR code, respectively, as circumstances warrant in accordance with processes described herein.

The storage device 410 may also store, and the directory service computer 400 may also execute, other programs, which are not shown. For example, such programs may include a confirmation message reporting application, which transmits confirmation messages to merchant devices. Other programs can also include, e.g., one or more data communication programs, database management programs, device drivers, etc.

The storage device 410 may also store one or more databases 418 required for operation of the directory service computer 400. Such databases may include, for example, a database of merchant financial institution (FI) identification numbers and issuer FI identification numbers (which may be, for example, bank identification numbers (BINs), and associated cryptographic keys and/or public keys and other data needed for the directory service computer to properly generate and provide secure QR codes to merchants, and the like.

Figure 5:
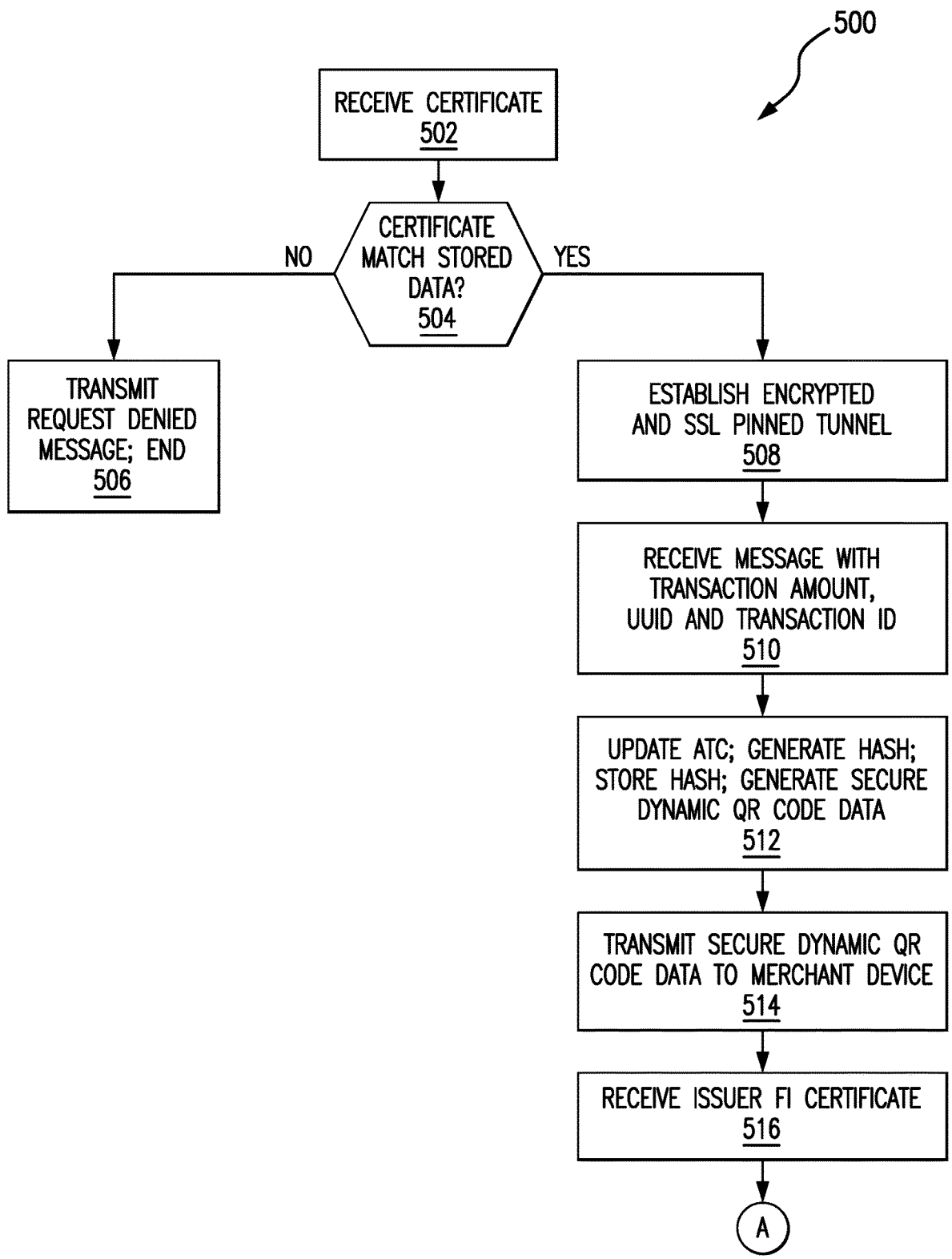
FIG. 5 is a flowchart illustrating a process for generating and utilizing a dynamic secure QR code in a purchase transaction in accordance with some embodiments of the disclosure.
Figure 5:
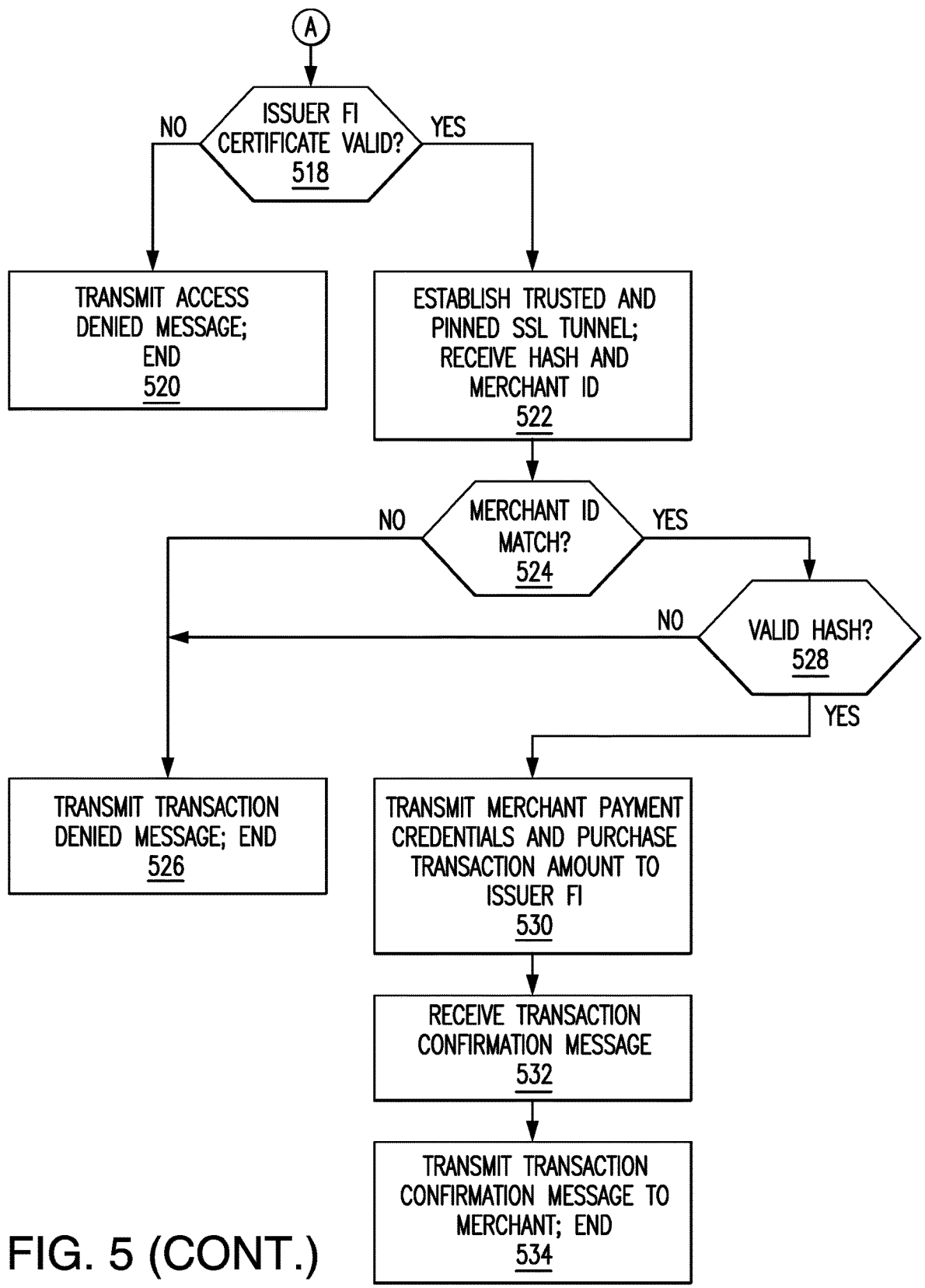

FIG. 5 is a flowchart 500 illustrating a directory service computer process for generating and utilizing a dynamic secure QR code in a purchase transaction between a merchant device and a consumer's mobile device in accordance with some embodiments. The directory service computer receives 502 an acquirer-signed merchant certificate from a merchant device. Next, if the acquirer signed merchant certificate does not match a stored certificate 504, then the directory service computer transmits 506 a request denied message to the merchant device, and the process ends. However, if the acquirer signed merchant certificate matches a stored acquirer certificate in step 504, then the directory service computer establishes 508 an encrypted and Pinned SSL tunnel between the merchant device and the directory service computer. The directory service computer then receives 510 a message via the encrypted Pinned SSL tunnel that is created with the transaction amount, a UUID, and a transaction identifier (which uniquely identifies the transaction for the merchant). (Use of such an encrypted Pinned SSL tunnel provides non-repudiation for the merchant because the merchant utilized the digital signature.)

Referring again to FIG. 5, the directory service computer next updates 512 an Application Transaction Count (ATC) for the merchant, generates a Hash value (by using the merchant ID, merchant name, merchant location data, the transaction amount, the ATC, the UUID, and the transaction ID), stores the Hash value, and then generates a dynamic secure QR code (by combining the Hash, the transaction ID and the merchant ID). (The Hash value is a secure one-way Hash and guarantees data integrity; the Hash value ensures that the data has not been tampered with.) Next, the directory service computer transmits 514 the dynamic secure QR code data to the merchant device for generating and then displaying a dynamic secure QR code on the merchant's display screen (not shown). The secure QR code can then be read by a camera component (not shown) of a consumer's mobile device. The directory service computer next receives 516 the certificate of an issuer FI and checks 518 to see if the certificate is valid (by attempting to match it to an issuer FI certificate stored by the directory service computer). If the certificate is not valid (e.g., no match was found), then the directory service computer transmits 520 an access denied message, and the process ends.

However, if in step 518 the issuer FI certificate is valid, then the directory service computer establishes 522 a trusted and Pinned SSL tunnel with the issuer FI (which provides non-repudiation for the issuer FI), and receives a message from the issuer FI containing the Hash, the transaction ID, and the merchant ID. The directory service computer then determines 524 if the merchant ID matches a stored merchant ID, and if not transmits 526 a transaction denied message to the issuer FI, and the process ends. However, if in step 524 the merchant ID matches a stored value, then the directory service computer attempts to validate 528 the Hash. If the Hash is invalid, which could mean that the data has been tampered with, then the directory service computer transmits 526 a transaction denied message to the issuer FI, and the process ends. But if the Hash is valid in step 528, then the directory service computer transmits 530 the payment credentials and the transaction amount to the issuer FI via the Pinned SSL tunnel. Next, the directory service computer receives 532 a confirmation message from the issuer FI, and transmits 534 the confirmation message to the merchant device (via the merchant device's QR code app), and the process ends. In some embodiments, payment transaction processing continues in a "business as usual" (BAU) manner (which does not involve the directory service computer) to complete the purchase transaction.

Figure 6:
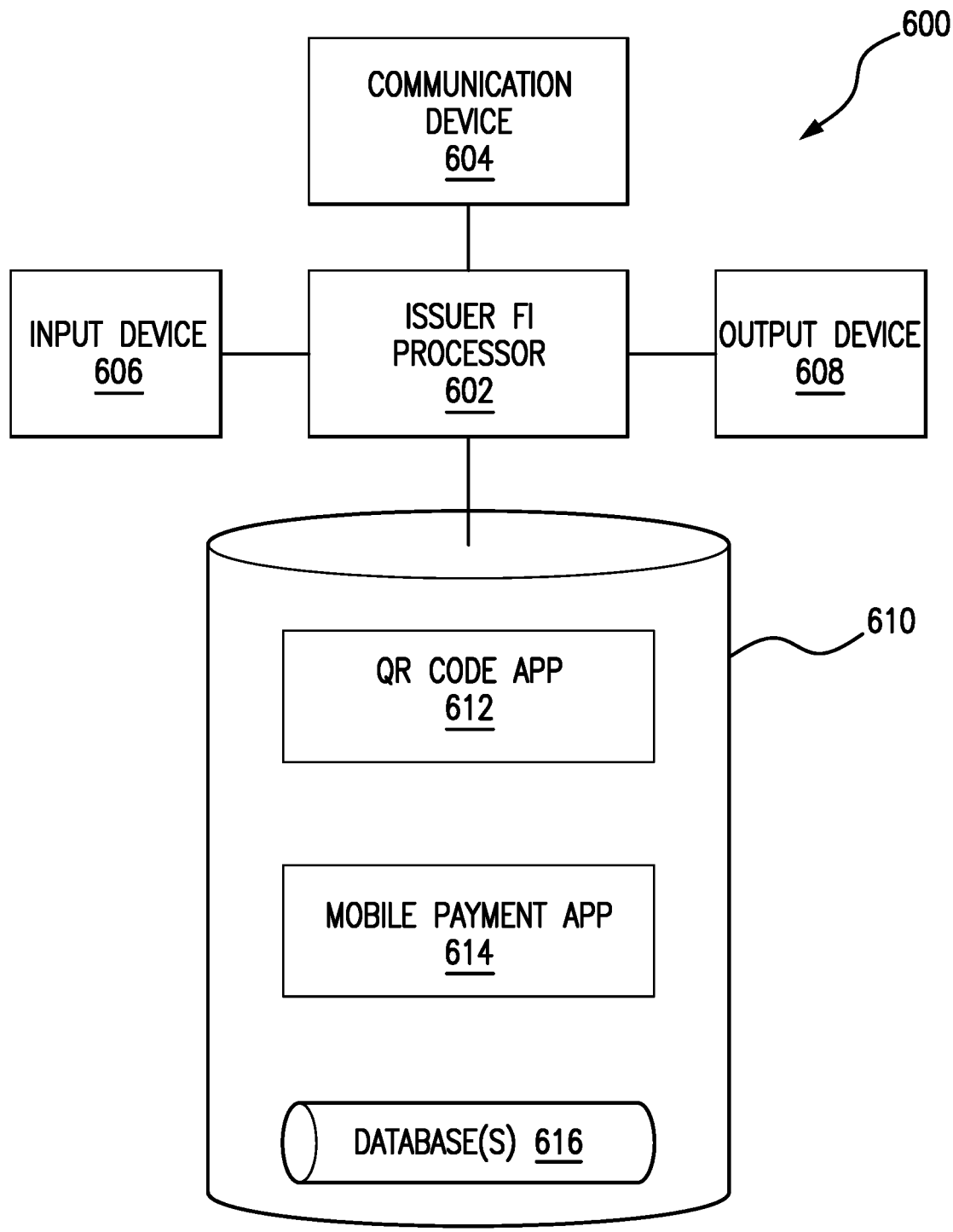
FIG. 6 is a block diagram of an issuer financial institution computer which may be used in accordance with a secure QR code process in accordance with some embodiments of the disclosure.

FIG. 6 is a block diagram of an issuer financial institution (FI) computer 600 which may be utilized in accordance with some aspects of the present disclosure. The issuer FI computer 600 may include standard components and/or custom-designed and/or proprietary components in terms of its hardware components and/or architecture, and may be controlled by software to cause it to function as described herein. For example, the issuer FI computer 600 may include server computer hardware.

Referring to FIG. 6, the issuer FI computer 600 may include an issuer FI processor 602 operatively coupled to a communication device 604, an input device 606, an output device 608, and a storage device 610. The issuer FI processor 602 may be constituted by one or more processors (one or more of which may be custom designed), and operates to execute processor-executable steps, contained in program instructions described below, so as to control the issuer FI computer 600 to provide desired functionality.

Communication device 604 may be used to facilitate communication with, for example, other devices (such as mobile devices operated by consumers and/or a directory service computer, and/or one or more computers operated by a payment processing network, as shown in FIG. 1). For example, communication device 604 may comprise numerous communication ports (not separately shown), to allow the issuer FI computer 600 to communicate simultaneously with a number of other consumer mobile devices, including communications as required to simultaneously handle numerous requests for processing secure QR code data for conducting purchase transactions. Thus, the communication device 604 may be configured for wireless communications and/or wired communications via various different types of networks, such as the Internet.

Input device 606 may comprise one or more of any type of peripheral device typically used to input data into a computer. For example, the input device 606 may include a keyboard and a mouse. Output device 608 may comprise, for example, a display and/or a printer. In some embodiments, the input device 606 and the output device 608 comprise a touch screen.

Storage device 610 may comprise any appropriate information storage device, including combinations of magnetic storage devices (e.g., hard disk drives), optical storage devices such as CDs and/or DVDs, and/or semiconductor memory devices such as Random Access Memory (RAM) devices and Read Only Memory (ROM) devices, as well as flash memory and the like. Any one or more of such information storage devices may be considered to be a non-transitory computer-readable storage medium or computer usable medium or memory.

Storage device 610 stores one or more computer programs for controlling the issuer FI processor 602. The programs comprise program instructions (which may be referred to as computer readable program code means) that contain processor-executable process steps of the issuer FI computer 600, executed by the issuer FI processor 602 to cause the issuer FI computer 600 to function as described herein.

The programs may include one or more conventional operating systems (not shown) that control the issuer FI processor 602 to manage and coordinate activities and sharing of resources in the issuer FI computer 600, and to serve as a host for application programs that run on the issuer FI computer 600.

The storage device 610 may store a secure QR code application 612 that controls the issuer FI processor 602 to enable the issuer FI computer 600 to receive QR code data from consumer mobile devices, and to communicate with a directory service computer to implement secure QR code purchase transaction processing. In addition, the storage device 610 may store a mobile device payment application 614, which enables the issuer FI computer 600 to process purchase transaction authorization requests.

The storage device 610 may also store, and the issuer FI computer 600 may also execute, other programs, which are not shown. For example, such programs may include a confirmation message reporting application, which transmits confirmation messages to a directory service computer. Other programs can also include, e.g., one or more data communication programs, database management programs, device drivers, and the like.

The storage device 610 may also store one or more databases 616 required for operation of the issuer FI computer 600. Such databases may include, for example, a database of consumer mobile device identification data, a database of consumer payment card account data, and directory service computer data.

Figure 7:
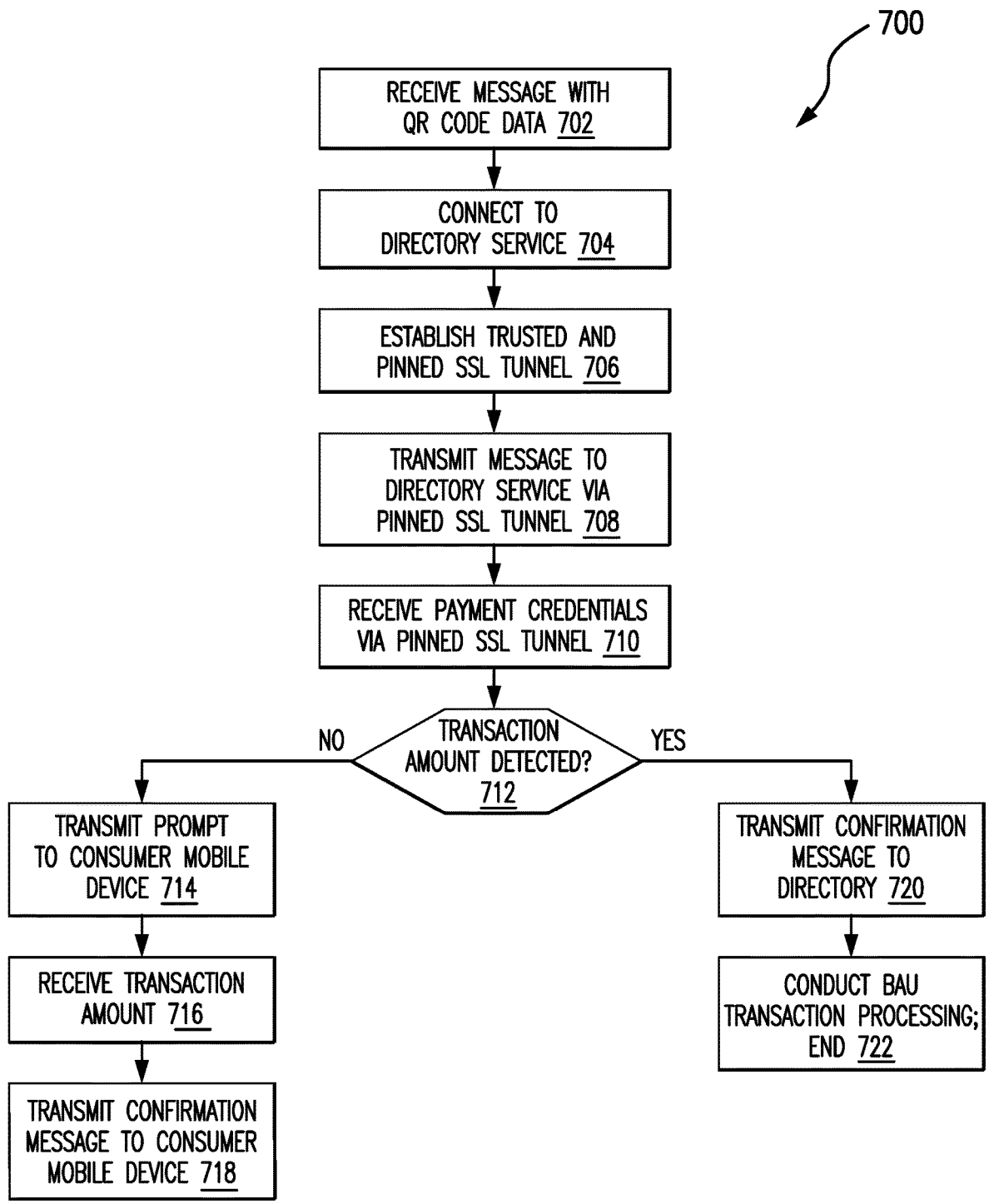
FIG. 7 is a flowchart illustrating a static secure QR code process in accordance with some embodiments of the disclosure.

FIG. 7 is a flowchart illustrating a static secure QR code process 700 in accordance with some embodiments described herein. To initiate a purchase transaction, a consumer opens an issuer wallet application or a mobile banking application running on his or her mobile device and then scans a merchant's static secure QR code. The consumer mobile device then transmits the scanned merchant QR code data to the consumer's issuer FI. Thus, the consumer's issuer FI computer receives 702 a message from the consumer's mobile device that includes the merchant QR code data. The issuer FI then connects 704 to the directory service computer, and authenticates to the directory service computer with its own certificate (which a trusted third party generated during the onboarding process). After the issuer FI's identity is verified the issuer FI and the directory service computer establish 706 a trusted and Pinned SSL tunnel between them, which provides non-repudiation for the Issuer FI. Next, the issuer FI transmits 708 a message to the directory service computer that includes the transaction ID and the secure static QR code (which consists of the merchant ID and the Hash) via the Pinned SSL tunnel.

During processing, the directory service computer looks up the merchant payment details (by utilizing the merchant ID found in the secure static QR code), validates the Hash (for security and data integrity purposes, to ensure that the message has not been tampered with) and then sends the merchant's payment credentials to the issuer FI via the Pinned SSL tunnel. Accordingly, the issuer FI computer receives 710 the payment credentials via the Pinned SSL tunnel, and then detects 712 whether or not a transaction amount is included. If not, then the issuer FI computer transmits 714 a transaction amount request to the consumer's mobile device. The transaction amount request may be displayed, for example, on a display screen of the consumer's mobile device by the issuer wallet application or the mobile banking application (running on the consumer's mobile device). In this case, the consumer enters the transaction amount and then transmits it to the issuer FI computer, which receives 716 the transaction amount from the consumer's mobile device, transmits 718 a confirmation message back to the consumer's mobile device, and transmits 720 a confirmation message to the directory service computer. Lastly, the issuer FI computer conducts 722 business-as-usual (BAU) transaction processing of the purchase transaction to arrive at either an authorization or a decline of the purchase transaction, and the process ends. BAU processing may entail, in the case of a credit card transaction, the issuer FI computer determining that the consumer's credit card account includes adequate credit to cover the transaction amount of the purchase transaction, resulting in authorization of the transaction. On the other hand, BAU processing may entail the issuer FI computer declining the purchase transaction because the consumer's payment card account is in default or otherwise cannot support the transaction amount of the purchase transaction.

Utilizing either a static or a dynamic secure QR code in accordance with the disclosed processes prevents phishing attacks and hacking of QR codes for malicious purposes, which benefits both consumers and merchants. Furthermore, secure QR codes are versatile, are easy to use, and can be generated on, and scanned by, any type of mobile device having a digital camera. In addition, any merchant, payment processing entity, payment gateway provider, issuer FI, and/or acquirer FI can easily register or utilize an onboarding process with the directory service to enable the use of secure QR code processing in accordance with methods described herein. Moreover, use of the processes described herein can benefit merchants and/or issuer FIs due to reduced fraud costs through the use of Certificates and establishment of a Pinned SSL tunnel during processing, which also provides non-repudiation protection to either the merchant or the issuer FI, depending on which secure QR code process is being followed. Similarly, adoption of the disclosed techniques allows only registered merchants to conduct secure QR code payments in a manner that eliminates the redirection of funds to fraudulent merchants, which beneficially reduces money laundering and loss of money by consumers. Accordingly, consumers will gain confidence in QR code processing resulting from utilizing the secure QR code payments processes described herein. Moreover, consumers benefit from being provided with a seamless purchase transaction user experience utilizing secure QR code technology, without the need for near-field communication (NFC) support. In particular, the disclosed secure QR code service is easy, fast and secure, and may be made available to consumers on any mobile device having a camera without the need for a host card emulation (HCE) enabled device.

Furthermore, the secure QR code systems, apparatus and processes disclosed herein can enhance existing QR code processes, such at the Masterpass™ QR code electronic payment option, and provides QR code generation with identity verification in a secure and reliable manner, which includes data integrity and data non-repudiation capabilities. In addition, the generation of the secure QR code can support transfer of funds from a consumer to a merchant using any existing channels or networks, such as the automated clearing house (ACH), payment card account processing networks, prepaid card systems, or any other schemes where a QR code can be implemented to initiate and/or complete a financial transaction. As described herein, enabling the secure QR code financial transaction capability requires a directory service (which allows merchants and issuer FIs (such as banks) to register and permits generation of static and dynamic secure QR codes), and a secure, reliable QR code process for facilitating payments.

As used herein and in the appended claims, the term "computer" should be understood to encompass a single computer or two or more computers in communication with each other or a computer network or computer system. In addition, as used herein and in the appended claims, the term "processor" should be understood to encompass a single processor or two or more processors in communication with each other. Moreover, as used herein and in the appended claims, the term "memory" should be understood to encompass a single memory or storage device or two or more memories or storage devices. Such a memory and/or storage device may include any and all types of non-transitory computer-readable media, with the sole exception being a transitory, propagating signal.

The flow charts and descriptions thereof herein should not be understood to prescribe a fixed order of performing the method steps described therein. Rather, the method steps may be performed in any order that is practicable. In addition, the flow charts described herein should not be understood to require that all steps or elements be practiced in every embodiment. For example, one or more elements or steps may be omitted in some embodiments.

Although the present disclosure describes specific exemplary embodiments, it should be understood that various changes, substitutions, and alterations apparent to those skilled in the art can be made to the disclosed embodiments without departing from the spirit and scope of the disclosure as set forth in the appended claims.

What is claimed is:

1. A method for generating a dynamic secure QR code for use in a purchase transaction comprising:
    verifying, by a directory service computer, the identity of a merchant based on a match between an acquirer financial institution (FI)-signed certificate and a stored certificate, the acquirer FI-signed certificate received by the directory service computer from a merchant device along with a secure QR code request;
    establishing, by the directory service computer, an encrypted and Pinned SSL tunnel with the merchant device;
    receiving, by the directory service computer via the encrypted and Pinned SSL tunnel from the merchant device, a transaction message comprising a transaction amount, a universal unique identifier (UUID), and a transaction identifier (ID);
    updating, by the directory service computer, an application transaction count (ATC) associated with the merchant;
    generating, by the directory service computer, a secure one-way Hash value using a merchant identifier (ID), the transaction amount, the ATC, the UUID, and the transaction ID;
    storing, by the directory service computer, the secure one-way Hash value;
    generating, by the directory service computer, a dynamic secure QR code by combining the Hash value, the transaction ID and the merchant ID; and
    transmitting, by the directory service computer, the dynamic secure QR code to the merchant device for use in conducting a purchase transaction.

2. The method of claim 1, further comprising:
    receiving, by the directory service computer from an issuer FI computer, an issuer FI certificate;
    matching, by the directory service computer, the received issuer FI certificate to a stored issuer FI certificate; and
    establishing, by the directory service computer, a trusted and Pinned SSL tunnel with the issuer FI computer.

3. The method of claim 2, further comprising:
    receiving, by the directory service computer via the trusted the Pinned SSL tunnel, a message from the issuer FI comprising the Hash, the transaction ID, and the merchant ID;
    determining, by the directory service computer, that the merchant ID matches a stored merchant ID;
    determining, by the directory service computer, that the Hash matches a stored Hash associated with the merchant ID; and
    transmitting, by the directory service computer via the trusted and Pinned SSL tunnel to the issuer FI computer, payment credentials and the transaction amount.

4. The method of claim 3, further comprising:
    receiving, by the directory service computer, a confirmation message from the issuer FI computer; and
    transmitting, by the directory service computer, the confirmation message to the merchant device.

5. The method of claim 3, further comprising, subsequent to receiving the message from the issuer FI comprising the Hash, the transaction ID, and the merchant ID:
    determining, by the directory service computer, that the merchant ID does not match a stored merchant ID; and
    transmitting, by the directory service computer to the issuer FI computer, a transaction denied message.

6. The method of claim 3, further comprising, subsequent to determining that the merchant ID matches a stored merchant ID:
    invalidating, by the directory service computer, the Hash; and
    transmitting, by the directory service computer to the issuer FI computer, a transaction denied message.

7. The method of claim 2, further comprising, subsequent to receiving the issuer FI certificate:
    determining, by the directory service computer, that the received issuer FI certificate does not match a stored issuer FI certificate; and
    transmitting, by the directory service computer to the issuer FI computer, an access denied message.

8. The method of claim 1, wherein the transaction identifier comprises a unique identifier assigned by the merchant to the transaction.

9. A directory service computer comprising:
    a directory service processor;
    a communications device operably connected to the directory service processor;
    at least one input device operably connected to the directory service processor;
    at least one output device operably connected to the directory service processor; and
    a storage device operably connected to the directory service processor, wherein the storage device comprises instructions configured to cause the directory service processor to:
        verify the identity of a merchant based on a match between an acquirer financial institution (FI)-signed certificate and a certificate stored in the storage device, the acquirer FI-signed certificate received by the directory service computer from a merchant device along with a secure QR code request;
        establish an encrypted and Pinned SSL tunnel with the merchant device;
        receive a transaction message via the encrypted and Pinned SSL tunnel from the merchant device, the transaction message comprising a transaction amount, a universal unique identifier (UUID), and a transaction identifier (ID);
        update an application transaction count (ATC) associated with the merchant;
        generate a secure one-way Hash value using a merchant identifier (ID), the transaction amount, the ATC, the UUID, and the transaction ID;

store the secure one-way Hash value in the storage device;
generate a dynamic secure QR code by combining the Hash value, the transaction ID and the merchant ID; and
transmit the dynamic secure QR code to the merchant device for use in conducting a purchase transaction.

10. The apparatus of claim 9, wherein the storage device comprises further instructions configured to cause the directory service processor to:
receive an issuer FI certificate from an issuer FI computer;
match the received issuer FI certificate to an issuer FI certificate stored in the storage device; and
establish a trusted and Pinned SSL tunnel with the issuer FI computer.

11. The apparatus of claim 10, wherein the storage device comprises further instructions configured to cause the directory service processor to:
receive a message from the issuer FI via the trusted and Pinned SSL tunnel, the message comprising the Hash, the transaction ID, and the merchant ID;
determine that the merchant ID matches a merchant ID stored in the storage device;
determine that the Hash matches a Hash stored in the storage device that is associated with the merchant ID; and
transmit payment credentials and the transaction amount to the issuer FI computer via the trusted and Pinned SSL tunnel.

12. The apparatus of claim 11, wherein the storage device comprises further instructions configured to cause the directory service processor to:
receive a confirmation message from the issuer FI computer; and
transmit the confirmation message to the merchant device.

13. The apparatus of claim 11, wherein the storage device comprises further instructions, subsequent to the instructions for receiving the message from the issuer FI comprising the Hash, the transaction ID, and the merchant ID, configured to cause the directory service processor to:
determine that the merchant ID does not match a stored merchant ID; and
transmit a transaction denied message to the issuer FI computer.

14. The apparatus of claim 11, wherein the storage device comprises further instructions, subsequent to the instructions for determining that the merchant ID matches a stored merchant ID, configured to cause the directory service processor to:
invalidate the Hash; and
transmit a transaction denied message to the issuer FI computer.

15. The apparatus of claim 10, wherein the storage device comprises further instructions, subsequent to the instructions for receiving the issuer FI certificate, configured to cause the directory service processor to:
determine that the received issuer FI certificate does not match an issuer FI certificate stored in the storage device; and
transmit an access denied message to the issuer FI computer.

16. A system for generating a dynamic secure QR code for use in a purchase transaction comprising:
a directory service computer comprising a directory service processor, a communications device operably connected to the directory service processor, at least one input device operably connected to the directory service processor, at least one output device operably connected to the directory service processor, and a storage device;
a plurality of issuer financial institution (FI) computers operably connected to the directory service computer; and
a merchant device operably connected to the directory service computer;
wherein the storage device of the directory service computer comprises instructions configured to cause the directory service processor to:
verify the identity of a merchant associated with the merchant device based on a match between an acquirer financial institution (FI)-signed certificate and a certificate stored in the storage device, the acquirer FI-signed certificate received by the directory service computer from the merchant device along with a secure QR code request;
establish an encrypted and Pinned SSL tunnel with the merchant device;
receive a transaction message via the encrypted and Pinned SSL tunnel from the merchant device, the transaction message comprising a transaction amount, a universal unique identifier (UUID), and a transaction identifier (ID);
update an application transaction count (ATC) associated with the merchant;
generate a secure one-way Hash value using a merchant identifier (ID), the transaction amount, the ATC, the UUID, and the transaction ID;
store the secure one-way Hash value in the storage device;
generate a dynamic secure QR code by combining the Hash value, the transaction ID and the merchant ID; and
transmit the dynamic secure QR code to the merchant device for use in conducting a purchase transaction.

17. The system of claim 16, wherein the storage device of the directory service computer comprises further instructions configured to cause the directory service processor to:
receive an issuer FI certificate from an issuer FI computer of the plurality of issuer FI computers;
match the received issuer FI certificate to an issuer FI certificate stored in the storage device; and
establish a trusted and Pinned SSL tunnel with the issuer FI computer.

18. The system of claim 17, wherein the storage device of the directory service computer comprises further instructions configured to cause the directory service processor to:
receive a message from the issuer FI computer via the trusted and Pinned SSL tunnel, the message comprising the Hash, the transaction ID, and the merchant ID;
determine that the merchant ID matches a merchant ID stored in the storage device;
determine that the Hash matches a Hash stored in the storage device that is associated with the merchant ID; and
transmit payment credentials and the transaction amount to the issuer FI computer via the trusted and Pinned SSL tunnel.

19. The system of claim 18, wherein the storage device of the directory service computer comprises further instructions configured to cause the directory service processor to:
receive a confirmation message from the issuer FI computer; and
transmit the confirmation message to the merchant device.

20. The system of claim 18, wherein the storage device of the directory service computer comprises further instructions, subsequent to the instructions for receiving the message from the issuer FI comprising the Hash, the transaction ID, and the merchant ID, configured to cause the directory service processor to:

determine that the merchant ID does not match a stored merchant ID; and transmit a transaction denied message to the issuer FI computer.

21. The system of claim 18, wherein the storage device of the directory service computer comprises further instructions, subsequent to the instructions for determining that the merchant ID matches a stored merchant ID, configured to cause the directory service processor to:

invalidate the Hash; and transmit a transaction denied message to the issuer FI computer.

22. The apparatus of claim 17, wherein the storage device of the directory service computer comprises further instructions, subsequent to the instructions for receiving the issuer FI certificate, configured to cause the directory service processor to:

determine that the received issuer FI certificate does not match an issuer FI certificate stored in the storage device; and transmit an access denied message to the issuer FI computer.

* * * * *